United States Patent [19]
Nungesser

[11] 3,986,315
[45] Oct. 19, 1976

[54] ADJUSTABLE HEIGHT INSULATION PANEL

[75] Inventor: Wayne Terrance Nungesser, Bremen, Ohio

[73] Assignee: Diamond Power Specialty Corporation, Lancaster, Ohio

[22] Filed: Nov. 7, 1975

[21] Appl. No.: 630,061

[52] U.S. Cl. .............................. 52/584; 52/207; 52/407
[51] Int. Cl.² .................................... E04B 1/74
[58] Field of Search ............ 52/584, 207, 404–407; 49/372–374; 160/37

[56] References Cited
UNITED STATES PATENTS

| | | |
|---|---|---|
| 289,247 | 11/1883 | Gatton .................................. 49/372 |
| 2,498,966 | 2/1950 | Sauer .................................. 49/374 |
| 3,014,560 | 12/1961 | Krauss et al. ...................... 52/404 |
| 3,808,743 | 5/1974 | Renner .............................. 49/374 |

Primary Examiner—J. Karl Bell
Attorney, Agent, or Firm—Vytas R. Matas; Joseph M. Maguire

[57] ABSTRACT

A panel assembly of reflective insulation is formed to provide an adjustable height inner panel movably located next to a stationary outer panel. The inner panel is made slidably movable within a pocket formed adjacent to a face of the outer panel. The innermost face of the pocket has a retainer assembly which captures the inner panel to the face of the pocket in any height extension of the inner panel from the pocket to insure retention of the inner panel in the desired height extension.

8 Claims, 4 Drawing Figures

ADJUSTABLE HEIGHT INSULATION PANEL

BACKGROUND OF THE INVENTION

1. Field of the Invention

This invention relates generally to reflective insulation assemblies and particularly to selectively extendable panels of such reflective insulation.

2. Description of the Prior Art

The use of bright, or highly reflective sheets to provide thermal insulation for industrial equipment has been an established practice for a number of years. Ordinarily, aluminum or stainless steel sheets are used for this purpose. The high reflectivities that characterize these materials tend to obstruct the flow of radiant heat in order to provide an efficient, sturdy, lightweight, and long-lasting insulation.

Because the individual sheets in a particular insulating element usually are spaced from each other with intervening air gaps, heat transfer through convective processes is also reduced. Naturally, care must be taken to insure that all of these gaps are isolated from each other to prevent the development of air currents that degrade the convective insulation efficiency of the element.

In the commercial use of such insulation assemblies problems of fabrication and installation have been encountered. One of the most commonly occurring problems has been that of misfit of parts. The complex metallic structure of the reflective insulations requires that they be fabricated in a sheet metal shop and transported to the job site for installation. The sheet metal fabricator designs and builds the reflective insulation units from the construction design drawings of the objects to be insulated. Very often it is discovered when the fabricated reflective insulation units are delivered that the workmen who erected the structure deviated from the engineering specifications and drawings in the actual dimensions of the finished structure. The fabricated reflective insulation unit thus does not properly fit on the actual structure in the field. The reflective insulation structure must, therefore, be completely refabricated or modified to compensate for the nonspecification construction.

Field installation of such insulation also may require removal to allow quick and easy access to the insulated structure. As an example, the base of a nuclear reactor may require maintenance and periodic checking. It would be desirable to have some method of partially dropping some of the insulation to easily provide such maintenance and inspection.

SUMMARY OF THE INVENTION

The present invention solves the forementioned problems associated with prior art devices as well as others by providing an adjustable height reflective insulation panel assembly which is rigidly retained in selectively extended positions.

The panel assembly includes an outer panel having a number of spaced reflective insulation sheets and a pocket formed along one side to slidably accommodate an inner panel. The inner panel may be extended in and out of the pocket to any position and captured in that extended position by a latching assembly provided on the outside face of the pocket.

This latching assembly may be formed as an L shaped clip which has one leg extending along the face of the pocket and the other leg extending through a wall of the pocket to pierce the wall of the inner panel and prevent any movement of the inner panel within the pocket. To prevent the removal of the L shaped clip the leg extending along the pocket is retained by spring clips fastened to the pocket wall by spotwelding. The L shaped clip may be removed by rotating the clip out of the spring clips and pulling the second leg out of engagement with the inner panel.

From the foregoing it will thus be seen that one aspect of the present invention is to provide an adjustable height reflective insulation panel assembly.

Another aspect of the present invention is to provide a telescoping insulation panel assembly wherein the telescoping panel is rigidly retained in any number of extended positions.

These and other aspects of the present invention will be better understood after reviewing the following description of the preferred embodiment and the accompanying drawings.

DESCRIPTION OF THE PREFERRED EMBODIMENT

Figure 1:
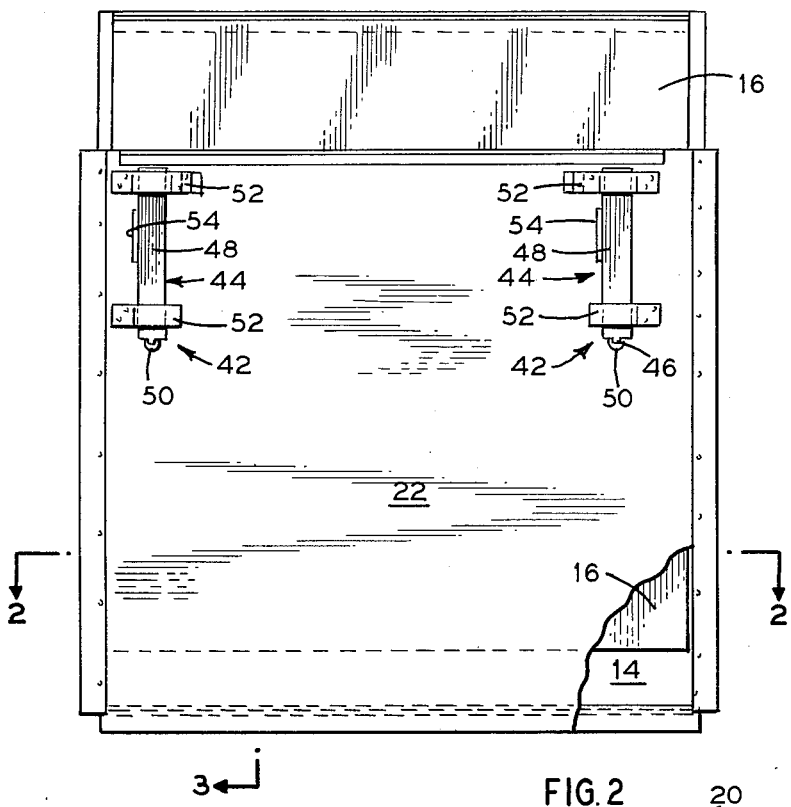
FIG. 1 depicts the panel assembly of the present invention.

Referring now to the drawings it will be understood that the showings therein are intended to depict a preferred embodiment of the present invention and not to limit the invention thereto.

Figure 3:
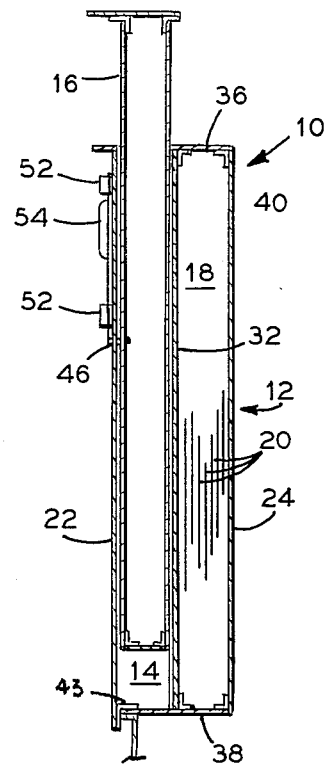
FIG. 3 is a sectional side view of the panel assembly taken along line 6—3 of FIG. 1.
Figure 2:
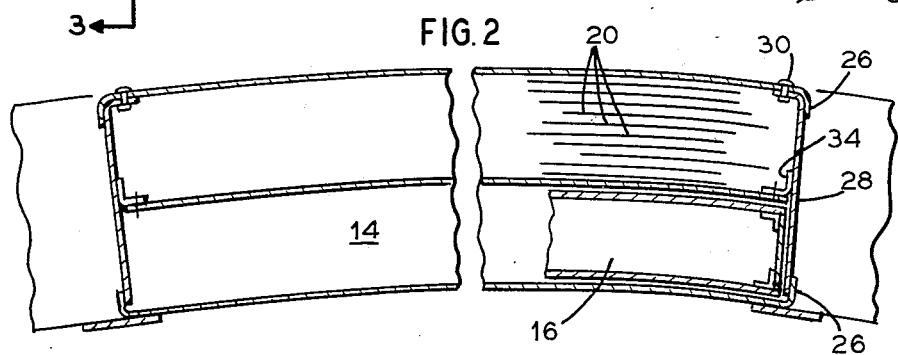
FIG. 2 is an enlarged sectional plan view of the panel assembly taken along line 2—2 of FIG. 1.
Figure 4A:
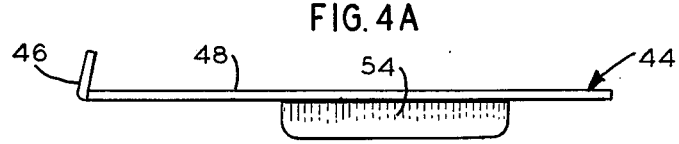
FIGS. 4 and 4a are side and top views of the L shaped clip retainers for retaining the inner panel of the panel assembly of FIG. 1.
Figure 4B:
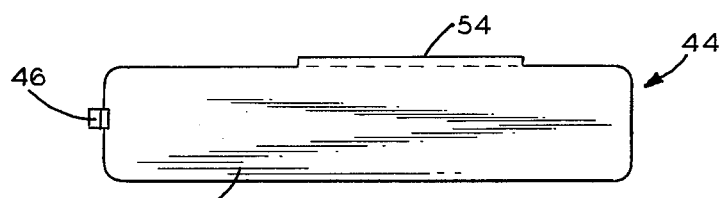

As may be best seen with reference to FIGS. 1 through 3 the panel assembly 10 includes an outer panel assembly 12 forming a pocket 14 within which an inner panel 16 is telescopically moved to numerous positions. The outer panel assembly 12 also provides an enclosed area 18 which is lined with individual sheets 20 of spaced reflective insulation. The spacing between sheets 20 may be maintained in numerous known ways such as spacing clips or off-sets formed in the sheets themselves. The inner panel 16 may be similarly lined with sheets of spaced reflective insulation.

The outer panel assembly 12 is formed from heavy gauge material such as stainless steel sheets approximately 0.025 in. thick to provide a rigid structure which is still lightweight. The outer panel assembly 12 is also assembled to insure that the pocket 14 is free from any obstructions such as pop-rivet heads which may jam the inner panel 16. To assemble the outer panel assembly 12 an inner case 22 and an outer case 24 are formed to have lips 26 inside of which a pair of L shaped side members 28 are located. The short leg of the members 28 is pop-riveted to the outer case 24 by pop-rivets 30. The ends of the long leg of the members 28 are spotwelded to the lips 26 of the inner case 22. To form the pocket 14 a central partition 32 is spotwelded bracket clips 34 which extend into the enclosure 18 and may be either pop-riveted or spotwelded to the members 28. The top of enclosure 18 is sealed by a top closure panel 36 which may be spotwelded to brackets 40 located in the enclosure 18. The bottom of the panel assembly 10 is sealed by a bottom closure panel 38 which may be formed as a flanged extension of the outer case 24 spotwelded to a flange 43 of the inner case 22 or which could also be formed as a flanged extension of the inner case 22. Clearly the bottom closure panel 38 is easily formed as a separate sheet and spotwelded to flanges of both the inner and outer cases 22 and 24.

The foregoing assembly thus insures that the pocket 14 is free of any burrs or protrusions, such as pop-rivets, which may jam the inner panel 16 and allows the inner panel 16 to move smoothly within the pocket 14. This type of panel assembly 10 is especially useful as a skirt for a nuclear reactor wherein the inner panel may be slidably adjusted to fit snug against the bottom head of the reactor.

To maintain the extended position of the inner panel 16 a pair of identical clip assemblies 42 are located on the inner panel 22 at opposite sides of the pocket 14 opening. Each clip assembly 42 has an L shaped member 44 having a short end 46 extending at substantially a right angle from a flat face 48. Holes 50 are formed in the inner case 22 through which the inner case 16 may be drilled or otherwise punctured when the desired extension of the inner case 16 from the pocket 14 is achieved. The short end 46 of the clip 44 is then extended through the hole 50 to further extend into the holes formed in the inner case 16. The clip 44 is then rotated to engage the flat face 48 of the clip 44 within a pair of spring clips 52 spotwelded at one end to the inner case 22. To ease the rotation of the clips 44 into the spring clips 52 a tab 54 is formed at substantially right angles to the flat face 48 of the clip 44.

Certain modifications and improvements will occur to those skilled in the art upon consideration of the foregoing. As an example, the short end 46 of the clip 44 may be formed down to a sharp point which will pierce the inner panel 16 when pressure is applied to the clip 44 to simultaneously pierce and lock the inner panel in the desired extended position. It will be understood that such modifications and improvements have been deleted for the sake of conciseness and readability but are clearly within the scope of the present invention.

What I claim is:

1. A variable extension reflective insulation panel assembly comprising:
    a stationary panel assembly of reflective insulation sheets forming a pocket along one side of said panel;
    a movable panel of reflective insulation slidably extending from the pocket of said stationary panel to numerous predetermined positions; and
    locking means for retaining said movable panel in any of said numerous predetermined positions of extending said movable panel from the pocket of said stationary panel.

2. An assembly as set forth in claim 1 wherein said stationary panel assembly includes a sealed enclosure having a plurality of spaced sheets of reflective insulation and an open-ended enclosure adjacent thereto forming the pocket for said movable panel.

3. An assembly as set forth in claim 2 wherein said locking means includes a clip mounted on said open-ended enclosure and having an end extending through said open-ended enclosure and into said movable panel to lock said movable panel to said open-ended enclosure in any of said predetermined positions.

4. an assembly as set forth in claim 1 wherein said stationary panel includes:
    an inner and an outer case having flanged side edges;
    side panels fastened inside the flanged edges of said inner and outer case;
    a central panel fastened to said side panels to form a pair of enclosures between said inner and outer case; and
    a plurality of spaced sheets of reflective insulation being mounted in one of said enclosures and said movable panel being mounted in the other enclosure.

5. An assembly as set forth in claim 4 wherein said inner case has an aperture formed therein alignable with any of numerous apertures formed in said movable panel and wherein said locking means includes a first member extending through the aperture in said inner case and into any aligned aperture in said movable panel to lock said movable panel in one of said numerous predetermined positions.

6. A variable extension reflective insulation panel assembly comprising:
    a stationary panel assembly of reflective insulation sheets forming a pocket along one side of said panel formed from an inner and an outer case having flanged side edges, side panels fastened inside the flanged edges of said inner and outer case, a central panel fastened to said side panels to form a pair of enclosures between said inner and outer case, a plurality of spaced sheets of reflective insulation being mounted in one of said enclosures and said movable panel being mounted in the other enclosure, and wherein said inner case has an aperture formed therein alignable with an aperture formed in said movable panel;
    a movable panel slidably extending from the pocket of said stationary panel;
    locking means for retaining said movable panel in a position extending from the pocket of said stationary panel including a first member extending through the aligned apertures in said inner case and said movable panel to prevent said movable panel from moving in the other enclosure and a second member substantially normal to said first member extending along the face of said inner case and a spring clip mounted to said inner case to capture said second member.

7. an assembly as set forth in claim 6 wherein said second member has a tab formed substantially normal to the face of said inner case for rotating said second member into engagement with said spring clip.

8. An assembly as set forth in claim 7 wherein said movable panel is a hollow enclosure.

\* \* \* \* \*